UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PROCESS OF WORKING WITH HYDROGEN UNDER PRESSURE.

1,077,034. Specification of Letters Patent. Patented Oct. 28, 1913.

No Drawing. Application filed April 18, 1912. Serial No. 691,731.

*To all whom it may concern:*

Be it known that I, CARL BOSCH, subject of the King of Prussia, residing at Ludwigshafen-on-the-Rhine, Germany, have invented new and useful Improvements in the Process of Working with Hydrogen Under Pressure, of which the following is a specification.

In operations in which hydrogen is employed under pressure in iron tubes or vessels at high temperatures above 450° C., it has been found that, if the iron contains carbon, the tubes or vessels are liable to suffer to such an extent that after a time they are not able to withstand the high pressure employed.

In my application for patent Serial No. 675,618 I have described an apparatus for working with hydrogen under pressure and at high temperatures, comprising an inner vessel which is of itself incapable of permanently withstanding the pressure employed, and means for supporting the said vessel to enable it to withstand the pressure, which means are not capable of retaining gas under pressure. I have now discovered that the said difficulty can be overcome in another way which can be used either by itself or in combination with the apparatus referred to. I have found that the detrimental action of hydrogen under pressure on iron heated tubes or vessels ceases below a temperature not essentially higher than 450° C. In the process according to the present invention therefore I take care that the iron wall which has to sustain the pressure and which is heated is maintained at a temperature essentially between 100° and 450° C., and it is in general advantageous for the purpose of economizing heat that the temperature of this wall sustaining the pressure should be kept, for instance, between 300° and 400° C.

The process of my invention is of particular importance in the catalytic production of ammonia from its elements, for instance when employing a ferruginous catalytic agent at a temperature above 500° C., for since it is only necessary to arrange for the removal of heat to such an extent that the outer wall does not have a temperature exceeding 450° C., it is readily possible to work without the introduction of outside heat in any way, simply using the heat of reaction to maintain the temperature of the catalytic material.

When carrying out my present invention, it is possible to employ any sort of iron which possesses the requisite mechanical solidity, for instance the iron may be rich or poor in carbon, or may contain no carbon at all, like, for instance, the material known as Edel stahl.

In this application I do not claim the use of pressures of less than 5 atmospheres.

Now what I claim is:—

1. The process of working with hydrogen at a temperature exceeding 450° C. and under a pressure exceeding five atmospheres, which consists in passing the hydrogen under pressure through a hot iron tube or vessel, but maintaining the temperature of the wall sustaining the pressure, at essentially between 100° and 450° C.

2. The process of working with hydrogen at a temperature exceeding 450° C. and under a pressure exceeding 5 atmospheres, which consists in passing the hydrogen under pressure through a hot iron tube or vessel containing contact material, but maintaining the temperature of the wall sustaining the pressure, at essentially between 100° and 450° C.

3. The process of producing ammonia by passing hydrogen and nitrogen at a pressure exceeding 5 atmospheres through an iron tube or vessel containing contact material at a temperature exceeding 450° C., while maintaining the temperature of the wall sustaining the pressure, at essentially between 100° and 450° C.

4. The process of producing ammonia by passing hydrogen and nitrogen at a pressure exceeding 5 atmospheres through an iron tube or vessel containing ferruginous contact agent at a temperature exceeding 450° C., while maintaining the temperature of the wall sustaining the pressure, at essentially between 100° and 450° C.

5. The process of producing ammonia by passing hydrogen and nitrogen under a pressure exceeding 5 atmospheres through a hot iron tube or vessel containing a ferruginous contact agent at a temperature exceeding 500° C., while maintaining the temperature of the wall sustaining the pressure, at between 200° and 400° C.

In testimony whereof I have hereunto set my hand in the presence of two subscribing witnesses.

CARL BOSCH.

Witnesses:
ERNEST F. EHRHARDT,
JOS. PFEIFFER.